United States Patent [19]

Yasuoka

[11] Patent Number: 4,546,233

[45] Date of Patent: Oct. 8, 1985

[54] ROBOT ARM HAVING BEARING SUPPORT

[75] Inventor: Hirotoshi Yasuoka, Aichi, Japan

[73] Assignee: Mitsubishi Denki Kabushiki Kaisha, Tokyo, Japan

[21] Appl. No.: 574,216

[22] Filed: Jan. 26, 1984

[30] Foreign Application Priority Data

Jan. 26, 1983 [JP] Japan ................................. 58-10882

[51] Int. Cl.⁴ .............................................. B23K 9/12
[52] U.S. Cl. .................................. 219/125.1; 228/45; 248/648; 414/719; 901/42; 901/48
[58] Field of Search ........................ 219/125.1, 125.11; 228/45; 414/719; 901/42, 48, 15, 18; 248/648, 600, 567

[56] References Cited

U.S. PATENT DOCUMENTS

| 3,840,128 | 10/1974 | Swoboda, Jr. et al. | 901/18 |
| 4,024,961 | 5/1977 | Stolpe | 901/48 |
| 4,378,959 | 4/1983 | Susnjara | 901/48 |

FOREIGN PATENT DOCUMENTS

| 2848385 | 6/1979 | Fed. Rep. of Germany | 901/48 |
| 1393349 | 5/1975 | United Kingdom . | |
| 1485318 | 9/1977 | United Kingdom . | |
| 854708 | 8/1981 | U.S.S.R. | 901/48 |

Primary Examiner—Clifford C. Shaw
Attorney, Agent, or Firm—Sughrue, Mion, Zinn Macpeak & Seas

[57] ABSTRACT

A robot includes a generally cylindrical stationary table adapted to be fixed on a floor, and has an outer peripheral surface formed with a circumferential gear. A rotary table is supported rotatably about the outer peripheral surface of the stationary table. A motor for rotating the rotary table is provided on the rotary table, and is connected to a motor gear meshing with the circumferential gear on the stationary table. An upper arm is supported tiltably on the rotary table, and has an upper end on which a front arm is supported. The front arm carries at its free end a working member, such as a welding torch. Another motor is provided on the upper arm for tilting it. A tension spring is disposed in the stationary table and has one end connected to the lower end of the upper arm, and another end connected to the stationary table at a point thereof about which the rotary table is rotatable. The tension spring serves to reduce the load on the motor which tilts the upper arm.

10 Claims, 2 Drawing Figures

4,546,233

ROBOT ARM HAVING BEARING SUPPORT

BACKGROUND OF THE INVENTION

1. Field of the Invention

This invention relates to a robot, and more particularly, to an articulated robot which is especially useful for performing arc welding in a desired position.

2. Description of the Prior Art

A known arc welding robot comprises a stationary table fixed on a floor, a rotary table mounted rotatably on the stationary table, a motor mounted on the stationary table for rotating the rotary table, a front arm carrying a welding torch at its free end, and an upper arm provided tiltably on the rotary table for supporting the front arm. The welding torch and the front and upper arms are tilted, and the rotary table is rotated, as required for bringing the robot into a proper position for arc welding. An improved arc welding robot has a plurality of sensors provided at the free end of its front arm, and an additional number of shafts. These sensors and shafts create a large load bearing on the upper arm, and necessitates the use of a motor having a large capacity for driving the upper arm. The use of a hydraulic or pneumatic device has been proposed for reducing the load bearing on the upper arm driving motor. The addition of any such extra device, however, results in an undesirably large and complicated robot.

SUMMARY OF THE INVENTION

It is, therefore, an object of this invention to provide a robot which enables a reduction in the load bearing on a motor for driving the upper arm when the upper arm is tilted.

It is another object of this invention to provide a robot having an upper arm which can be securely supported when it is tilted.

It is still another object of this invention to provide a robot which is compact and simple in construction.

These objects are attained by a robot comprising a stationary table fixed on a floor, a rotary table mounted rotatably on the stationary table, a motor for rotating the rotary table, a front arm carrying a working member at its free end, an upper arm provided tiltably on the rotary table for supporting the front arm and a motor mounted on the upper arm for tilting it, characterized in that the motor for rotating the rotary table is mounted on the rotary table, and that a tension spring has one end fastened to the lower end of the upper arm and another end supported rotatably by the stationary table to support the upper arm when it is tilted.

DETAILED DESCRIPTION OF THE INVENTION

Figure 1:
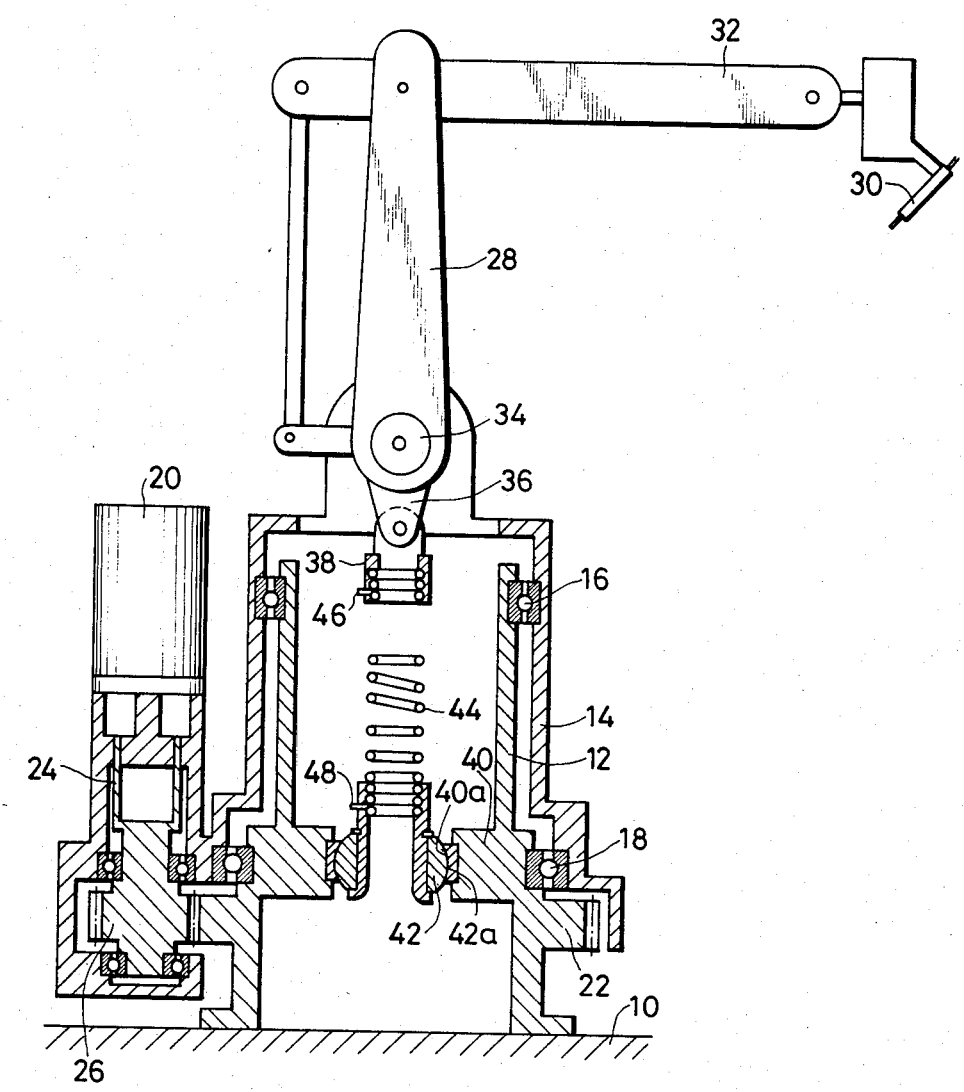
FIG. 1 is a side elevational view, partly in section, of an arc welding robot embodying this invention.

An arc welding robot embodying this invention is shown in FIG. 1. It includes a stationary table 12 fixed on a floor 10, and rotary table 14 mounted rotatably on the stationary table 12 by bearings 16 and 18. A motor 20 for rotating the rotary table 14 is mounted on the rotary table 14, and the stationary table 12 is hollow. The stationary table 12 has a circumferential gear 22 in its lower portion. The motor 20 is integral with the rotary table 14. The rotation of the motor 20 is transmitted through a speed reducer 24 to a motor gear 26 which is engaged with the circumferential gear 22. Therefore, the rotation of the motor 20 causes the rotation of the motor gear 26 about its own axis, and the rotation of the motor gear 26 and the motor 20 about the circumferential gear 22. This causes the rotation of the rotary table 14 about the stationary table 12.

An upper arm 28 is supported tiltably on the top of the rotary table 14, and a front arm 32 carrying a welding torch 30 at its free end is tiltably supported on the upper arm 28. A motor 34 is provided at the junction between the rotary table 14 and the upper arm 28 for tilting the upper arm 28 relative to the rotary table 14.

According to a salient feature of this invention, a tension spring 44 is provided between the upper arm 28 and the stationary table 12 for reducing the load bearing on the upper arm tilting motor 34 when the upper arm 28 is tilted. The spring 44 has one end fastened to the lower end of the upper arm 28, and another end supported rotatably on the stationary table 12 at a point which corresponds to the center of rotation of the rotary table 14. The upper arm 28 has a lug 36 projecting from its lower end, and a spring support 38 is attached to the lug 36. The stationary table 12 includes a bearing portion 40 provided with a spherically concave surface 40a having a center on the longitudinal axis of the stationary table 12 about which the rotary table 14 is rotatable. A spring support 42 has a spherically convex surface 42a which is complementary to the concave surface 40a, and is fitted in the bearing portion 40 rotatably about both horizontal and vertical axes. The tension spring 44 is threadedly connected to the spring support 38 at one end, and the spring support 42 at the other end. A pin 46 secures the upper end of the spring 44 to the upper spring support 38, while another pin 48 secures the lower end of the spring 44 to the lower spring support 42. Thus, the spring 44 provides a firm support for the upper arm 28 in its tilted position to thereby reduce the load bearing on the motor 34 when the upper arm is tilted.

Figure 2:
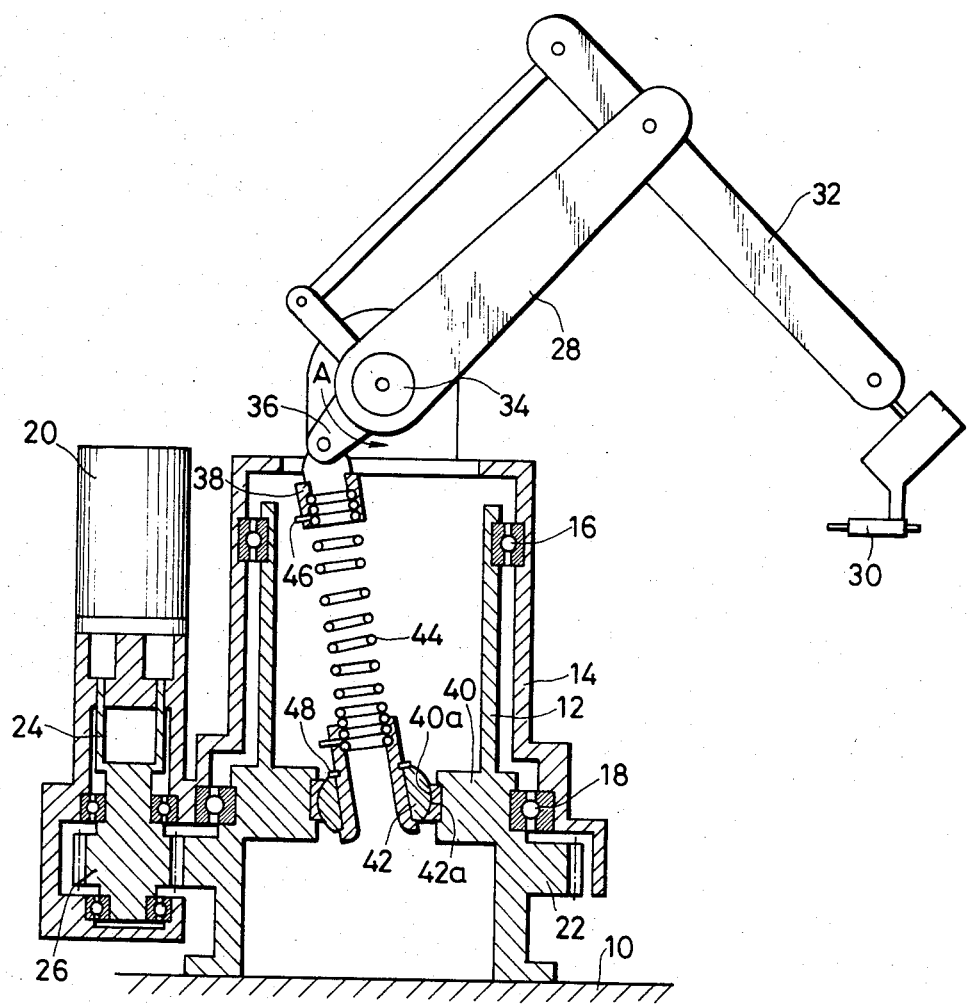
FIG. 2 is a similar view showing the robot in an operative position by way of example.

FIG. 2 shows the upper arm 28 in its tilted position. It has an angle of 45° to the vertical. The spring 44 pulls the lower end of the upper arm 28, and urges it to rotate in the direction of an arrow A in FIG. 2 to thereby reduce the load bearing on the motor 34. The spring 44 is tiltable and rotatable relative to the bearing portion 40, since the convex surface 42a of the lower spring support 42 is tiltable and rotatable in the concave surface 40a of the bearing portion 40. The spring 44 is, therefore, tiltable and rotatable in accordance with the tilting of the upper arm 28 and the rotation of the rotary table 14 to maintain itself in its optimum position for urging the lower end of the upper arm 28 to rotate in the direction of the arrow A. In the specific example shown in the drawings, the spring 44 has been found to expand by 35 mm when the upper arm 28 has been tilted by 45° from its vertical position, and by 10 mm when the upper arm has been tilted by 20°.

As is obvious from the foregoing description, this invention enables a simple structure to reduce the load bearing on the motor for tilting the upper arm without employing any extra hydraulic or pneumatic load reducing device.

What is claimed is:

1. A robot comprising:

a generally cylindrical stationary table adapted to be fixed on a floor, and having an outer peripheral surface formed with a circumferential gear;

a rotary table supported rotatably about said outer peripheral surface of said stationary table;

a first motor fixed on said rotary table and having an output shaft operably connected to a motor gear, said motor gear meshing with said circumferential gear to thereby rotate said rotary table about said stationary table when said first motor is energized;

a front arm carrying a working member at its free end;

an upper arm supported tiltably on said rotary table, and having an upper end on which the other end of said front arm is supported;

a second motor provided on said upper arm for tilting said upper arm; and a tension spring having one end connected to the lower end of said upper arm, and the other end connected to said stationary table at a bearing point about which said rotary table is rotatable.

2. A robot as set forth in claim 1, wherein said second motor is mounted at the point at which said upper arm is supported on said rotary table.

3. A robot as set forth in claim 2, wherein said lower end of said upper arm has a first spring support to which a first spring is attached, said one end of said spring being threadedly connected to said first spring support.

4. A robot as set forth in claim 3, wherein said other end of said spring is tiltable and rotatably coupled to said stationary table.

5. A robot as set forth in claim 3, wherein said bearing point of said stationary table comprises a spherically concave surface in which a second spring support having a spherically convex surface is rotatably fitted.

6. A robot as set forth in claim 5, wherein said other end of said spring is threadedly connected to said second spring support.

7. A robot as set forth in claim 6, wherein each of said first and second spring supports is provided with a pin for securing said spring in position.

8. A robot as set forth in claim 1, further comprising bearing means on said stationary table for rotatably supporting said rotary table.

9. A robot as set forth in claim 8, wherein a speed reducer is provided between said first motor and said motor gear.

10. A robot as set forth in claim 9, wherein said working member is a welding torch.

* * * * *